United States Patent
Paxton et al.

(10) Patent No.: US 8,561,577 B1
(45) Date of Patent: Oct. 22, 2013

(54) ADJUSTABLE DOG HARNESS ADAPTED FOR PULLING, WALKING, VEHICLE RESTRAINT AND OTHER DIVERSE APPLICATIONS

(76) Inventors: Stephen E. Paxton, Brainerd, MN (US); Lisa M. Lugo-Paxton, Brainerd, MN (US)

( * ) Notice: Subject to any disclaimer, the term of this patent is extended or adjusted under 35 U.S.C. 154(b) by 1214 days.

(21) Appl. No.: 12/113,938

(22) Filed: May 1, 2008

Related U.S. Application Data

(60) Provisional application No. 60/915,430, filed on May 1, 2007.

(51) Int. Cl.
*A01K 27/00* (2006.01)

(52) U.S. Cl.
USPC .............................. 119/863; 119/792; 119/856

(58) Field of Classification Search
USPC .................. 119/856, 863, 792, 793, 769, 771
IPC .................................. A01K 27/00; A62B 35/00
See application file for complete search history.

(56) References Cited

U.S. PATENT DOCUMENTS

| | | |
|---|---|---|
| 1,614,083 A | 1/1927 | Plantico |
| 1,800,421 A | 4/1931 | Wickersham et al. |
| 1,906,043 A | 4/1933 | Max |
| 2,026,383 A | 12/1935 | John |
| 2,437,628 A | 3/1948 | Warren |
| 2,464,867 A | 3/1949 | Johnson |
| 2,555,027 A | 5/1951 | Clayton |
| 2,826,172 A | 3/1958 | Buckle et al. |
| 3,310,034 A | 3/1967 | Dishart |
| 3,948,222 A | 4/1976 | Longshore et al. |
| 4,597,359 A | 7/1986 | Moorman |
| 4,676,198 A | 6/1987 | Murray |
| D293,139 S | 12/1987 | Roa |
| 4,715,618 A | 12/1987 | Harris |
| 4,896,630 A | 1/1990 | Luce |
| 4,907,541 A | 3/1990 | Thompson |
| D310,435 S | 9/1990 | Cleveland |
| 4,970,991 A | 11/1990 | Luce |
| D313,677 S | 1/1991 | Hammon et al. |
| 5,035,203 A | 7/1991 | Cardenas |
| 5,154,660 A | 10/1992 | Snyder et al. |

(Continued)

OTHER PUBLICATIONS

"Howling Dog Pet and Mushing Supplies", HTTP://www.howlingdogalaska.com/.

(Continued)

*Primary Examiner* — David Parsley
(74) *Attorney, Agent, or Firm* — Albert W. Watkins

(57) ABSTRACT

An adjustable dog harness has a pair of adjustable length neck straps through which a dog's head passes. A chest strap passes from the neck under the chest and back, to connect with a pair of adjustable length side straps. These side straps pass up from the chest strap to a belly region that may optionally include a belly strap. The side straps are formed into folds, at approximately 45 degree angles, to continue as adjustable length back straps to the adjustable length neck straps. A sliding position ring couples a lead or leash to the side/back strap folds. Buckles are provided in the side straps, and in the optional belly strap, to permit rapid placement and removal of the harness. Through appropriate adjustment of the side and back straps, the harness will alternatively be adapted to function as a pulling, walking, or vehicle harness and for other diverse applications.

12 Claims, 2 Drawing Sheets

(56) References Cited

U.S. PATENT DOCUMENTS

| | | | |
|---|---|---|---|
| 5,167,203 | A | 12/1992 | Scott et al. |
| 5,427,061 | A | 6/1995 | McCullough |
| 5,443,037 | A | 8/1995 | Saleme |
| 5,503,113 | A | 4/1996 | Knight |
| 5,529,018 | A | 6/1996 | Butts |
| 5,713,308 | A * | 2/1998 | Holt, Jr. .................. 119/856 |
| 5,794,571 | A | 8/1998 | Goldberg |
| 5,896,831 | A | 4/1999 | Alpert |
| 5,913,285 | A | 6/1999 | Pritchard |
| 5,915,335 | A | 6/1999 | Holt, Jr. |
| 5,937,794 | A | 8/1999 | Hediger |
| 5,950,570 | A | 9/1999 | Dickerson |
| D424,761 | S | 5/2000 | Mortenson |
| 6,085,694 | A | 7/2000 | Simon |
| 6,101,979 | A | 8/2000 | Wilson et al. |
| D434,535 | S | 11/2000 | Koch |
| 6,161,505 | A | 12/2000 | Noguero |
| 6,164,245 | A | 12/2000 | Johnson |
| 6,253,713 | B1 | 7/2001 | Giedeman, III et al. |
| 6,427,635 | B1 | 8/2002 | Ballard |
| 6,450,130 | B1 * | 9/2002 | Goldberg .................. 119/792 |
| 6,543,390 | B2 | 4/2003 | Lowery |
| 6,564,749 | B1 | 5/2003 | Dorsey |
| 6,564,754 | B1 | 5/2003 | Cohen |
| 6,637,377 | B2 | 10/2003 | Lobanoff et al. |
| 6,679,198 | B1 | 1/2004 | Lagarde |
| 6,694,923 | B1 | 2/2004 | Fouche |
| 7,284,505 | B1 | 10/2007 | Paxton et al. |
| D571,058 | S | 6/2008 | Grooms |
| 2003/0150400 | A1 | 8/2003 | Lobanoff et al. |
| 2004/0025804 | A1 | 2/2004 | Smith et al. |

OTHER PUBLICATIONS

Fido Gear. "Skijoring", HTTP://www.fidogear.com/store/merchant.ihtml?id=8&step=2. Sep. 13, 2004, 3 pages.

"Ski-Jor Padded Hip Belt", HTTP://www.coldspotfeeds.com/product.asp?idProduct=798&idShopper=70191&idl=24613892&idB . . . Sep. 13, 2004, 2 pages.

"Skijoring", HTTP://www.akkosports.com/english/skijoring_backpacks.htm. Sep. 13, 2004, 3 pages.

* cited by examiner

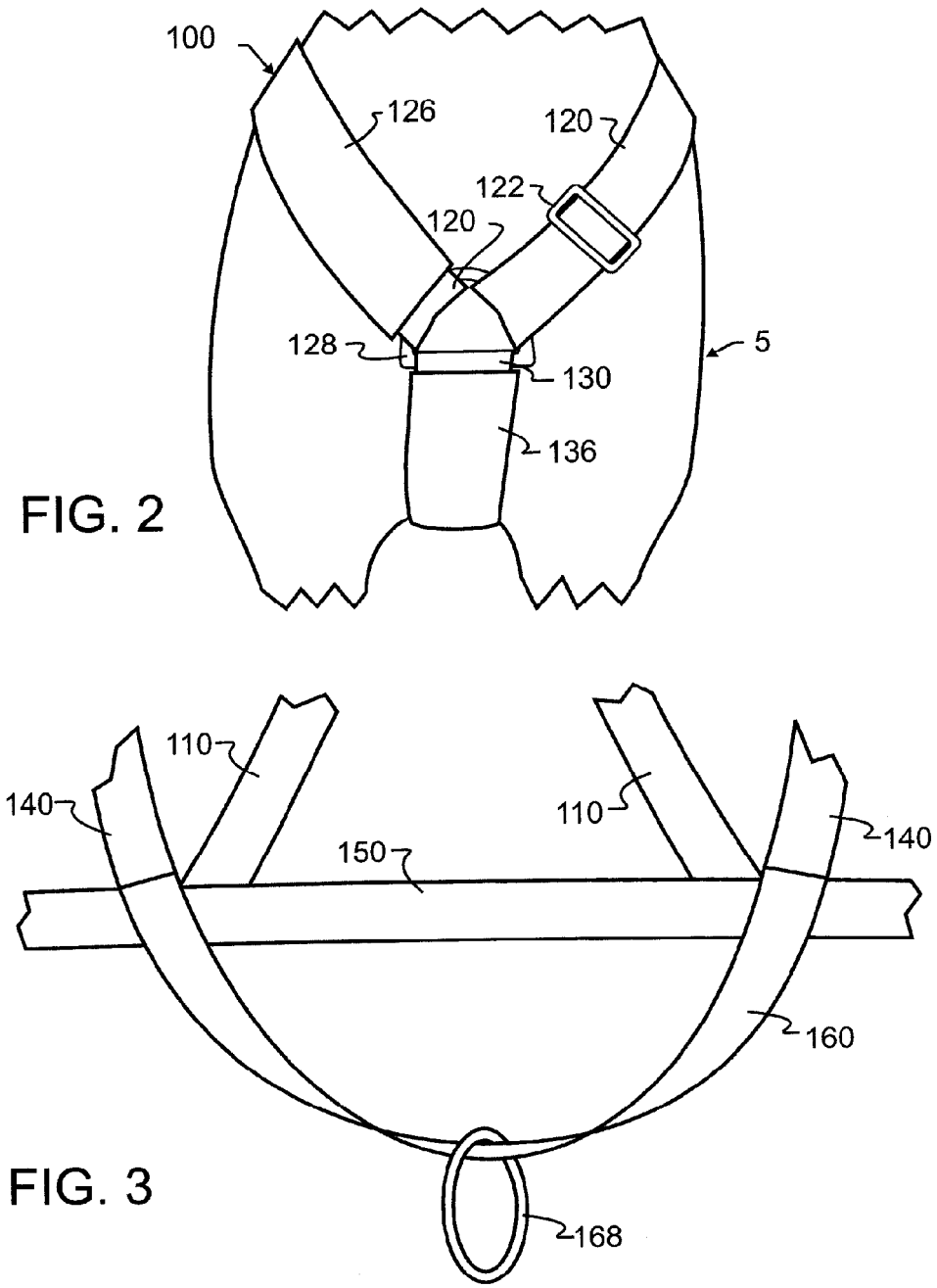

ADJUSTABLE DOG HARNESS ADAPTED FOR PULLING, WALKING, VEHICLE RESTRAINT AND OTHER DIVERSE APPLICATIONS

CROSS REFERENCE TO RELATED APPLICATIONS

This application claims priority to U.S. provisional application Ser. No. 60/915,430, filed May 1, 2007, entitled "Adjustable Pulling Harness" and naming the present inventors, the contents which are incorporated herein by reference in entirety.

BACKGROUND OF THE INVENTION

1. Field of the Invention

This invention pertains to animal husbandry generally, and more specifically to animal tethering systems and harnesses useful for skijor and other pulling applications, walking, vehicle restraint and other diverse applications.

2. Description of the Related Art

Skijor is a sport where a dog pulls a person on skis over the snow. Most commonly, the person will wear a skijor belt generally about their mid-section that is coupled through a lead to a pulling harness on the dog. Skijor provides excellent winter activity for a dog and person, and so has many participants. Competitions are regularly organized which permit many different dogs and skiers to compete on a trail.

A pulling harness is a leather, rope, webbing or other generally flaccid material configured to allow a dog to exert force through the neck and chest area to an attachment point or points at the rear of the harness. This allows the dog to pull light to heavy loads alone or in tandem with other dogs. The load may comprise a skier, as done in skijor competitions, or a sled or other object.

Many dog breeds are bred to pull, and many others can be taught to pull. Consequently, a suitable harness will require adaptation to a wide variety of dimensions and sizes of dogs. Furthermore, it is the object of a pulling harness to allow the dog to pull without injury or discomfort. Pulling harnesses must not injure the dog when pulling due to: choking at the base of the throat; pressure on shoulders joints; downward pressure on the spinal cord at the back of the neck; or downward or side pressure on the hips. In addition a pulling harness should not restrict the dog's chest expansion thus inhibiting his ability to breath.

There are a number of other additional features that have been generally overlooked heretofore in the sport of skijor that would be highly desirable. Among these are the harnessing of a dog for travel to and from a trail and then for skijor. This would heretofore have typically required separate harnesses with the resulting confusion over which harness to use for what application. In addition, the changing of the harnesses required additional time, adding to the overall burden serving to discourage a person and dog from actively participating.

Car harnesses share many requirements with pulling harnesses, but have additional desired features. Common requirements between car harnesses and pulling harnesses include not: causing choking at the base of the throat; applying pressure on shoulders joints, downward pressure on the spinal cord at the back of the neck, or downward or side pressure on the hips; or restricting the dog's chest expansion, thus inhibiting his ability to breath. Additional important features for a car harness include that a car harness restrain the dog even in a serious accident. The car harness must also accommodate movement such that the dog may sit, turn around, lie down, and stand while being restrained. The restraint cannot be too severe, or the dog will likely bite or chew the restraining device. A large dog is capable of generating over a ton of cutting pressure on his rear teeth, so it is not uncommon for a dog to bite through harnesses in a single bite. In addition, the car harness must restrain the dog irrespective of the direction the dog is facing at the time of an impact, and also irrespective of the direction of impact. Many prior art harnesses only protect the dog in the event the dog is facing forward and the crash is directly from the front. However, the dog is not always facing forward, and impacts are not always to the front of a vehicle. As a result, many car harnesses are not designed to restrain a dog in the event of an accident, but are instead designed to keep the dog from bothering the driver while traveling. Most such harnesses have not been tested to determine whether they would provide adequate protection to a dog, or withstand the forces applied in a vehicular accident. Finally, car harnesses will most desirably act as temporary walking harnesses, such that during travel the dog may be released from the vehicle and walked to permit the dog to move about and relieve itself, or for use traveling between a residence and vehicle.

In contrast to pulling and car harnesses, harnesses designed to walk a dog explicitly use choking or similar restrictive methods to stop the dog from pulling the dog walker as the dog is being walked. This is accomplished by designing the various straps of the harness such that when pressure is applied from the leash or tether, the harness will pull up under the throat, lifting and applying pressure to the dog's throat.

As may be appreciated, each of these harness types have been designed in the prior art with different constructions to accomplish some or many of the foregoing objectives or requirements. A number of patents found in the prior art illustrate harnesses, the teachings of each which are incorporated herein by reference. These include U.S. Pat. Nos. 6,101,979 by Wilson et al, entitled "Adjustable safety pet harness;" 1,800,421 by Wickersham et al, entitled "Adjustable dog harness;" 5,794,571 by Goldberg, entitled "Vehicular safety restraints for pets;" 4,597,359 by Moorman, entitled "Vehicle safety platform for pets;" 1,906,043 by Bernstein, entitled "Dog harness;" Des 424,761 by Mortenson, entitled "Dog leash;" 2,826,172 by Buckle et al, entitled "Animal actuated restraining dog harness;" 5,167,203 by Scott et al, entitled "Pet safety restraint;" Des 434,535 by Koch, entitled "Harness for dogs;" 1,614,083 by Plantico; 2,026,383 to Gyulay; 2,437,628 to Warren; 2,464,867 to Johnson; 2,555,027 to Clayton; 3,310,034 to Dishart; 3,948,222 by Longshore et al; 4,676,198 by Murray; 4,715,618 by Harris; 4,896,630 by Luce; 4,907,541 by Thompson; 4,970,991 by Luce; 5,035,203 by Cardenas; 5,154,660 by Snyder et al; 5,427,061 by McCullough; 5,443,037 by Saleme; 5,474,329 by Wade et al; 5,503,113 by Knight; 5,529,018 by Butts; 5,896,831 to Alpert; 5,913,285 by Pritchard; 5,915,335 by Holt; 5,937,794 to Hediger; 5,950,570 to Dickerson; and 6,164,245 by Johnson; 6,253,713 by Giedeman et al; 6,427,635 by Ballard; 6,543,390 by Lowery; 6,564,749 by Dorsey; 6,637,377, 2003/0150399, and 2003/0150400 by Lobanoff et al; 2004/0025804 by Smith et al; Des 310,435 by Cleveland; and Des. 313,677 to Hammon et al. Webster's New Universal Unabridged Dictionary, Second Edition copyright 1983, is additionally incorporated herein by reference in entirety for the definitions of words and terms used herein.

In spite of the many years and much development in this industry, there has not heretofore existed a single harness which could be used effectively for pulling, vehicle restraint, walking, and other diverse applications.

SUMMARY OF THE INVENTION

In a first manifestation, the invention is an adjustable dog harness that will alternatively be adapted to function as a pulling, walking, or vehicle harness and for other diverse applications. The harness comprises at least one adjustable length neck strap operative to pass a dog's head; a pair of adjustable length side straps; a chest strap passing from the adjustable length neck strap to connect with the pair of adjustable length side straps; and a pair of adjustable length back straps coupling the at least one adjustable length neck strap to the pair of adjustable length side straps.

In a second manifestation, the invention is a method of adjusting an adjustable dog harness having adjustable back and side straps. According to the method, the adjustable dog harness is affixed about a dog. A pulling force on the harness is next determined to either lift a neck region up on the dog's neck, stay neutral with respect to the neck region, or alternatively pull down on the spine adjacent to the neck region. Responsive to the determining step, the length of the adjustable back straps are changed by a first amount, and the length of the adjustable side straps are changed oppositely to the first amount.

OBJECTS OF THE INVENTION

Exemplary embodiments of the present invention solve inadequacies of the prior art by providing an improved, adjustable dog harness. It is an object of the present harness to not chafe or abrade the dog's skin at points of contact. It is a further object of this harness to be quickly and easily deployed upon a dog. It is yet another object of this harness to avoid damaging a dog's throat muscles, windpipe, vocal cords or nerves and to avoid interference with a dog's ability to breath. It is an even further object of this harness to give enhanced control over hard pulling dogs. It is another object of this harness to distribute the pressures generated during operation over a large surface of the harness. It is a further object of this harness to restrain a dog while traveling in a vehicle. It is yet another object to safely restrain the dog in the event of a sudden stop or an accident, to prevent injury to the dog and to others in the vehicle, and to distribute the pressures generated by a sudden stop or an accident over the surface of the harness the dog is wearing. A further object of the invention is to permit sufficient movement to permit the dog to sit, turn around, lie down, and stand while being restrained, all while not undesirably jeopardizing the safety of the animal. An additional object of the invention is to allow the pulling harness to readily be adapted to a walking harness, having characteristic choking and lifting found in walking harnesses. A further object of the invention is to provide the foregoing with components which are readily manufactured without special expense or unusual process. Yet another object of the present invention is to permit substantial flexibility in application to different dogs and activities.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 2 illustrates the preferred dog harness of FIG. 1 from a front view.

FIG. 3 illustrates the preferred dog harness of FIG. 1, detached from the dog and laid flat, by enlarged sectional and top view.

DESCRIPTION OF THE PREFERRED EMBODIMENT

Figure 1:
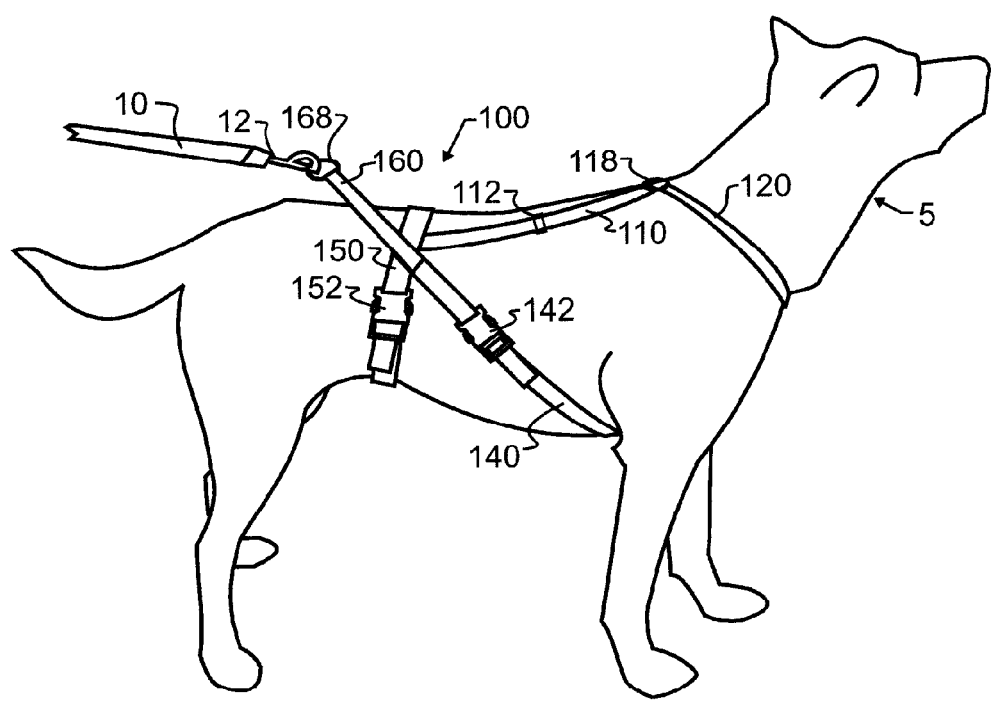
FIG. 1 illustrates a preferred dog harness in combination with a dog and designed in accord with the teachings of the present invention from a side view. It will be understood herein that the preferred embodiment has similar or identical appearance from either side, with consideration for or option of either including or not including in one or both side views belly strap 150 and likewise either including or not including adjustment buckle 152.

Manifested in the preferred embodiment, and illustrated in FIGS. 1-3, the present invention provides an adjustable dog harness 100 adapted for pulling, walking, vehicle restraint and other diverse applications. This preferred embodiment harness 100 is designed as a pulling harness, allowing a dog 5 to comfortably pull a light to moderate weight load such as a skier or sled coupled through a tether, lead, leash or similar coupler 10. Harness 100 is designed to fit a wide range of dog breeds and body types ranging in weight generally from 25 to 80 lbs. The adjustability of harness 100 is designed to reduce injuries in pulling dogs and enable one harness to fit a wide range of dogs.

Preferred harness 100 comprises a pair of back straps 110, a pair of neck straps 120, a chest strap 130, a pair of side straps 140, an optional belly strap 150, and a coupling strap 160. In the preferred embodiment, each of these straps 110, 120, 130, 140, 150 and 160 are made up of nylon webbing, though those skilled in the art will recognize that other materials may also be suitable or desirable for particular applications. The specific length of the webbing will be determined, as is known in the art, by the desired size of the harness. Back straps 110 attach to neck straps 120 via O-ring 118. Neck straps 120 are in turn coupled with chest strap 130 through D-ring 128. A lead 10 may be coupled through fastener 12 to O-ring 168.

Adjustment provided and used in preferred harness 100 simply based upon the dog size includes adjusting slides 122, which are known in the crafts and notions industry as slides which permit straps to be adjusted for length and then will hold those straps to that length during periods of forceful tension. Adjusting slides 122 are used to adjust the length of neck straps 120 to fit the dog size and shape. These adjusting slides 122 allow for a snug fit which is essential around the neck for a pulling dog to prevent injury to the shoulder joints. If the neck portion of harness 100 is too loose or at an improper angle, harness 100 may slide down onto the dog's shoulders, which would lead to injury during pulling.

While not illustrated, an adjusting slide similar to adjusting slides 122 could optionally be provided in chest strap 130, which would also simply allow the preferred harness 100 to accommodate dogs of different sizes. Such adjustment would allow side straps 140 to clear the dog's front legs as the straps travel up toward belly strap 150. In some cases, such an adjustment may be desirable to accommodate chest variation between different breeds of dogs. Some breeds are very flat chested without much depth, and others have a deep protruding chest.

Four way adjustment of preferred harness 100, adjustment beyond that required for proper fitting of dogs of different sizes, is provided through two adjusting slides 112 and two combination buckle-slides 142. These buckle-slides 142 provide both separation commonly associated with buckles, and also adjustment of strap length associated with slides such as aforementioned adjusting slides 112, 122. There are several different known techniques for obtaining both quick separation of a buckle and adjustment of length of a strap, any which are considered to be incorporated herein in the present disclosure with reference to buckle-slides. Buckle-slides 142 simplify putting the harness on the dog, since the harness may simply be slipped over the dog's head and then affixed at the buckle-slides 142, and these buckle-slides 142 also allow for chest girth adjustment over the ribs.

Applying preferred harness 100 to dog 5 is far more convenient and easily accomplished than in the prior art. Using harness 100, the buckles 142, 152 will be disconnected. In the preferred embodiment, these buckles are, in fact, high quality snaps that are closed simply by sliding the two ends together, and which are opened by manually squeezing the two ears together and then pulling, as is known in the art. Consequently, disconnecting is very fast. Next, the neck portion defined by straps 120 is passed over the head and about the neck of dog 5. Once again, this is a very simple and quick maneuver. Then the male portions of buckle-slides 142 will be passed under the dog's front legs, and wrapped back up to the respective female snap portions, where they will be inserted and snapped into engagement. While a person will have to reach around the dog's front legs, this too will be a very fast operation. The final step is the wrapping of belly strap 150 about the belly of dog 5, and again the engagement of buckle-slide 152. Consequently, the dog does not need to step into or out of harness 100 in any way, and the application is very quick and efficient.

By providing adjustment of back straps 110 through adjusting slides 112, once side straps 140 are properly adjusted for chest girth, then slides 112 and buckle-slides 142 may be further adjusted to be balanced for an even pull for pulling and car harness applications. It is critical to the proper operation in these two applications that harness 100 not pull up under the dog's neck or down at the back of the neck.

Adjustment of harness 100 is achieved by determining whether harness 100 pulls up under the neck of dog 5 or down at the back of the neck. If harness 100 pulls up, side straps 140 will preferably be shortened, while back straps 110 will be lengthened. While it may be possible to achieve balance by adjusting only the side straps 140 or only back straps 110, in practice adjustment of all four lines is generally preferable. In contrast, if harness 100 pulls down at the back of the dog's neck, back straps 110 will be shortened, while side straps 140 will be loosened or lengthened.

Preferred embodiment harness 100 permits side-to-side movement of rear O-ring 168, allowing the attachment point of a lead or leash to slide and vary, which reduces horizontal forces on the dog's hips as the direction of pulling changes.

The 45 degree configuration between side straps 110 and back straps 140, which allows for a very even pull with no upward movement of the harness under the neck, is most preferably achieved by fabricating these two straps from one single contiguous or unitary strap. This angular relationship reduces the tendency of a harness to pull up under the throat, while at the same time preserving substantial strength and durability of the harness necessary for larger pulling forces.

Most preferably, the entire neck and chest/neck joints will also be provided with supplemental padding, to help prevent undesirable rubbing or interference with a dog. Such optional padding is illustrated as 126, 136 in FIG. 2, and it will be appreciated that such padding will simply be slid around straps 120, 130, and may be slid back to access adjusting slides as required.

From these foregoing figures, additional features and options become more apparent. First of all, the preferred harness and components therein may be manufactured from a variety of materials, including metals, resins and plastics, ceramics or cementitious materials, composites, natural fibers or even combinations of the above. The specific material used may vary depending upon a particular application and various cost and durability considerations, as well as other considerations that will be well-known and understood in the art. Secondly, the harness is adjustable at all critical points so that the pull on the harness may be adjusted to suit the particular size and dimension of any one of many diverse breeds of dogs. More particularly, a pulling harness must pull evenly about the neck region, neither pulling up or down. This has proven to be very difficult to control in the prior art, and has heretofore involved trial and error redesigns of a harness or custom manufacture to fit a particular dog.

As already described herein above, preferred harness 100 is designed for application not only with skijor, but also for dual use as a car harness used to restrain a dog while traveling in a car. Belly strap 150 is believed to be most consequential for this application. When implemented for dual use, a car coupler will need to be provided, for exemplary purposes including a length of webbing to attach the dog and harness 100 to a vehicle seatbelt female attachment point. Using the preferred harness 100, including optional belly strap 150, at the time of impact the belly strap and sliding O-ring 168 will lead to automatic alignment of the dog's body at the time of impact, with as little undesirable force upon the dog as possible. The harness is, in effect, self-aligning to any direction of impact relative to the dog, who may be similarly oriented at any direction at the time of impact. As harness 100 aligns, the tail of dog 5 will first be drawn into alignment, and then the chest will follow. As the dog's chest aligns, the harness becomes the aforementioned pulling harness, which keeps all forces aligned and distributed, without choking or applying upward or downward forces onto the dog.

As may be surmised from the foregoing, harness 100 is not only useful as a pulling or car harness, but may also be readily adapted to application for walking. As aforementioned, walking harnesses in contrast to pulling or car harnesses are generally designed to specifically pull up under the neck of a dog, so that the dog does not undesirably pull the owner about. From the foregoing adjustment section, adjustment of harness 100 is achieved by determining whether harness 100 pulls up under the neck of dog 5 or down at the back of the neck. If harness 100 is either neutral (no pulling up or down) or pulls down at the back of the dog's neck, back straps 110 will be shortened, while side straps 140 will be loosened or lengthened to adjust harness 100 to be operative as a walking harness.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. An adjustable dog harness that will alternatively be adapted to function as a pulling, walking, or vehicle harness and for other diverse applications, comprising:
   at least one adjustable length neck strap operative to pass a dog's head;
   a pair of adjustable length side straps;
   a chest strap passing from said at least one adjustable length neck strap to connect with said pair of adjustable length side straps; and
   a pair of adjustable length back straps coupling said at least one adjustable length neck strap to said pair of adjustable length side straps.

2. The adjustable dog harness of claim 1, wherein said adjustable length side straps further comprise folds, at approximately 45 degree angles, and continue as unitary members webbing as said pair of adjustable length back straps.

3. The adjustable dog harness of claim 1, wherein said side straps pass up from the chest strap to a belly region.

4. The adjustable dog harness of claim 3, further comprising a belly strap coupled within said belly region.

5. The adjustable dog harness of claim 1, further comprising a sliding position ring operatively coupling a leash to said pair of adjustable length side straps, said sliding position ring movable to lie closer to or farther from a first one of said pair of adjustable length side straps, and when lying closer to said first one of said pair of adjustable length side straps to lie farther from a second one of said pair of adjustable length side straps.

6. The adjustable dog harness of claim 1, further comprising buckles in said pair of adjustable length side straps to permit rapid placement and removal of said adjustable harness on a dog.

7. A pulling and walking dog harness, comprising:
at least one adjustable length neck strap operative to pass a dog's head;
a pair of adjustable length side straps adjustable between a first shorter length, a second medium length that is longer than said first length and a third longer length that is longer than said second length;
a chest strap passing from said at least one adjustable length neck strap to connect with said pair of adjustable length side straps; and
a pair of adjustable length back straps adjustable between a fourth shorter length, a fifth medium length that is longer than said fourth length and a sixth longer length that is longer than said fifth length, and coupling said at least one adjustable length neck strap to said pair of adjustable length side strap;
said pair of adjustable length back straps at said fourth shorter length and said pair of adjustable length side straps at said third longer length causing said dog harness to pull up and thereby perform as a walking harness;
said pair of adjustable length back straps at said fifth medium length and said pair of adjustable length side straps at said second medium length causing said dog harness to neither pull up or down and thereby perform as a pulling harness; and
said pair of adjustable length back straps at said sixth longer length and said pair of adjustable length side straps at said first shorter length causing said dog harness to pull down.

8. The pulling and walking dog harness of claim 7, wherein said adjustable length side straps further comprise folds, at approximately 45 degree angles, and continue as unitary members webbing as said pair of adjustable length back straps.

9. The pulling and walking dog harness of claim 7, wherein said side straps pass up from the chest strap to a belly region.

10. The pulling and walking dog harness of claim 9, further comprising a belly strap coupled within said belly region.

11. The pulling and walking dog harness of claim 7, further comprising a sliding position ring operatively coupling a leash to said pair of adjustable length side straps, said sliding position ring movable to lie closer to or farther from a first one of said pair of adjustable length side straps, and when lying closer to said first one of said pair of adjustable length side straps to lie farther from a second one of said pair of adjustable length side straps.

12. The pulling and walking dog harness of claim 7, further comprising buckles in said pair of adjustable length side straps to permit rapid placement and removal of said adjustable harness on a dog.

* * * * *